United States Patent
Eveleigh

(10) Patent No.: US 9,201,507 B2
(45) Date of Patent: Dec. 1, 2015

(54) SYSTEM AND METHOD FOR RAPID INPUT OF DATA

(75) Inventor: Simon F. Eveleigh, Chichester (GB)

(73) Assignee: CareFusion 303, Inc., San Diego, CA (US)

( * ) Notice: Subject to any disclaimer, the term of this patent is extended or adjusted under 35 U.S.C. 154(b) by 1830 days.

(21) Appl. No.: 11/280,743

(22) Filed: Nov. 15, 2005

(65) Prior Publication Data
US 2007/0109325 A1 May 17, 2007

(51) Int. Cl.
*G06F 3/023* (2006.01)
*G06F 3/0484* (2013.01)
*G06K 9/20* (2006.01)
*G06F 17/24* (2006.01)

(52) U.S. Cl.
CPC .......... *G06F 3/0236* (2013.01); *G06F 3/04847* (2013.01); *G06F 17/24* (2013.01); *G06K 9/2081* (2013.01)

(58) Field of Classification Search
CPC ... G06F 3/0236; G06F 3/04847; G06F 17/24; G06K 9/2081
USPC ......... 715/255, 209, 273, 269, 767, 863, 702, 715/802; 705/13, 21, 39, 41; 235/384, 380, 235/381; 73/1.01, 65.01
See application file for complete search history.

(56) References Cited

U.S. PATENT DOCUMENTS

| | | | |
|---|---|---|---|
| 4,016,542 A * | 4/1977 | Azure | 345/160 |
| 4,340,808 A * | 7/1982 | Donohoo | 377/13 |
| 5,544,299 A | 8/1996 | Wenstrand et al. | |
| 5,646,647 A * | 7/1997 | Chow | 715/856 |
| 6,081,256 A * | 6/2000 | Herget et al. | 345/159 |
| 6,310,613 B1 * | 10/2001 | Tanaka et al. | 345/173 |
| 6,313,849 B1 | 11/2001 | Takase et al. | |
| 6,678,891 B1 * | 1/2004 | Wilcox et al. | 725/42 |

(Continued)

FOREIGN PATENT DOCUMENTS

| | | | | |
|---|---|---|---|---|
| EP | 0961199 | * | 12/1999 | G06F 3/033 |
| EP | 0961199 A | | 12/1999 | |

(Continued)

OTHER PUBLICATIONS

PCT International Search Report for International Application No. PCT/US2006/044118 mailed Dec. 17, 2007.

(Continued)

*Primary Examiner* — Ece Hur
(74) *Attorney, Agent, or Firm* — McDermott Will & Emery LLP

(57) ABSTRACT

A data inputting system includes a communication device and user-activated control or input device, both coupled to a processor. Data and a focus indicator are displayed or otherwise communicated to a user through the communication device. The position of the focus indicator relative to the displayed data indicates a changeable portion of the displayed data. Changes to the displayed data are made by activating the input device, which may include one or more sets of up and down scroll keys. Each set of scroll keys may be used to change different portions of the displayed data. The processor automatically adjusts the position of the focus indicator based on predetermined criteria, thereby allowing changes to different portions of the displayed data. An associated method is disclosed wherein the focus indicator's position is adjusted after a predetermined time has elapsed from which the input device is deactivated.

15 Claims, 9 Drawing Sheets

(56) References Cited

U.S. PATENT DOCUMENTS

| | | | |
|---|---|---|---|
| 6,934,905 B1 * | 8/2005 | Tighe | 715/209 |
| 7,075,517 B2 * | 7/2006 | Soloviev | 345/163 |
| 7,502,017 B1 * | 3/2009 | Ratzlaff et al. | 345/173 |
| 2003/0139701 A1 * | 7/2003 | White et al. | 604/67 |
| 2003/0222925 A1 * | 12/2003 | Regelous | 345/856 |
| 2004/0125152 A1 * | 7/2004 | Sommers et al. | 345/856 |
| 2005/0011282 A1 * | 1/2005 | Voege et al. | 73/861.44 |
| 2005/0262428 A1 * | 11/2005 | Little et al. | 715/501.1 |
| 2009/0133301 A1 * | 5/2009 | Saxena et al. | 40/446 |
| 2010/0128115 A1 * | 5/2010 | Nakano | 348/65 |

FOREIGN PATENT DOCUMENTS

| | | | | |
|---|---|---|---|---|
| EP | 1205837 | * | 5/2001 | G06F 3/033 |
| EP | 1205837 A | | 5/2002 | |
| EP | 1205837 A2 | * | 5/2002 | G06F 3/033 |
| JP | A-62-105218 | | 5/1987 | |
| JP | A-07-105290 | | 4/1995 | |
| JP | 08029564 | | 2/1996 | |
| JP | A-10-171908 | | 6/1998 | |
| JP | A-2001-509921 | | 7/2001 | |
| JP | A-2004-061770 | | 2/2004 | |

OTHER PUBLICATIONS

Japanese Office Action dated Aug. 9, 2011 for Japanese Patent Application No. 2008/541269.

* cited by examiner

|  Case One | Case Two | Case Three | Case Four |
|---|---|---|---|
| 0 5 | → 2 0 0 | →3 0 0 | →1 1 0 0 |
| 0 5 | 2 1 0 | 3 1 0 | 1 1 1 0 |
| 1 0 | 2 2 0 | 3 2 0 | 1 1 2 0 |
| 2 0 | ⋮ | ⋮ | ⋮ |
| ⋮ | | | |
| 9 0 | 2 9 0 ⎫ 142 | 3 9 0 ⎫ 144 | 1 1 9 0 ⎫ 146 |
| 1 0 0 | 3 0 0 ⎭ | 4 0 0 ⎭ | 1 2 0 0 ⎭ |
| 1 1 0 | 4 0 0 | 5 0 0 | 1 3 0 0 |
| ⋮ | 5 0 0 | 6 0 0 | 1 4 0 0 |
| 140 ⎰ 1 9 0 | | | 1 5 0 0 |
| ⎱ 2 0 0 | | | |
| 3 0 0 | | | |
| ⋮ | | | |
| 9 0 0 | | | |
| 1 0 0 0 | | | |
| 1 1 0 0 | | | |
| ⋮ | | | |
| 1 9 0 0 | | | |
| 2 0 0 0 | | | |
| 2 1 0 0 | | | |
| ⋮ | | | |
| 2 9 0 0 | | | |
| 3 0 0 0 | | | → (FIG. 7) |

FIG. 6

|         | Case Five | Case Six | Case Seven |
|---------|-----------|----------|------------|

SYSTEM AND METHOD FOR RAPID INPUT OF DATA

BACKGROUND OF THE INVENTION

The invention relates generally to systems and methods for data entry, and more particularly, to a system and method for rapidly selecting items, either numerical or character based, from sequential lists of numbers, characters, or text.

Various medical devices and instruments typically found in a care providing institution are used to provide medication, monitor patient condition, and diagnose disease. Common to all of these devices is a need to enter therapeutic or patient-related values for various parameters that are used either to program the identification of the device or provide identification or other needed information that are then used by a computer-controlled system, which may be ward-based or institution wide, to monitor and record diagnoses and treatment related to a particular patient.

One example of a medical device where the input of relatively high numbers of parameter values is required is an infusion pump, an apparatus for administering medication to a patient. A valuable and much needed development, the medication infusion pump can be used to administer drugs to a patient in small, carefully measured doses at frequent intervals or, with some devices, slowly and continuously. A therapeutic regimen with an infusion pump can be controlled electronically to administer precisely measured quantities of a drug at precisely planned intervals to give a gradual infusion of medication into the patient. The infusion pump makes possible a closer approximation to the natural maintenance of biochemical balances in the body because of its operation in a repetitive small dose mode.

As availability of drugs, therapeutic techniques, and technological capability have improved, the demand for sophistication in drug delivery has increased. In many instances, this added sophistication results in more complicated infusion pump operation. Achieving this sophistication in drug delivery capability while maintaining ease of use has been a major challenge for infusion pump manufacturers.

As the sophistication of the available infusion pumps has increased, so too have the number of parameters that may be used to control the infusion. Typically, an infusion pump comprises a pumping element that causes a precisely measured flow of fluid to be infused to the patient. This pump element is controlled by a processor that generally has a programmable memory associated with it for storing instructions to be used by the processor to control the infusion. The sophistication of currently available infusion pumps with programmable processors and extensive memory capabilities for controlling complicated drug delivery schemes adds significantly to the choices available to a physician for prescribing a drug regimen to be infused.

The range of possible infusion parameters includes, but is not limited to, infusion rate, infusion duration, dose volume, lockout period, repeat period, bolus size, bolus rate, patient weight, syringe size, container volume, security codes, drug units (e.g. milligrams), drug concentration, concentration units, or pharmacokinetic parameters. Each of these parameters may be entered by a user into the memory of the pump using a keyboard connected directly to the pump. Alternatively, the pump may be programmed by commands received over a network or other communication scheme from a central computer, handheld device, or other data transfer system or device.

Because of the large number of therapeutic modalities and the extensive number of possible required parameters, manufacturers have been challenged to provide a user interface that assists the user in entering desired parameters by accelerating the entry process as much as possible while at the same time, simplifying the process. To accomplish this, earlier infusion pumps have been provided with a "fast key" scrolling system comprising two "up" scroll keys and two "down" scroll keys which are operable to increase or decrease pumping parameters, such as the mass flow rate setting shown on a display, or the VTBI (volume to be infused) setting shown on the display. In some cases, such scroll keys have been labeled with upward and downward pointing arrows or chevrons, such that an infusion pump includes a single-chevron UP key, a double-chevron UP key, a single-chevron DOWN key, and a double-chevron DOWN key. Pressing either of the single-chevron keys causes the display to scroll numerically upwardly or downwardly, but pressing either of the double-chevron keys causes the display to scroll in larger increments.

For example, assuming that the display shows "6", pressing the single-chevron UP key causes the display to scroll up by one unit at a time to show "7", "8", "9", "10", "11", and so on. Pressing the double-chevron UP key when the display shows "6" causes the display to scroll up firstly to show "10" and then to scroll up further in increments of ten until it reaches, for example, a display of "200", whereafter continued pressing of the double-chevron UP key causes the display to increase in increments of one hundred to show "300", "400", and so on. When the display shows "700", pressing the single-chevron UP key causes the display to show "701", "702", "703", and so on. One problem with such a system is that, for example, the single-chevron UP key would have to be pressed fifty times to change the display from "700" to "750."

One attempt to save time when entering infusion parameters involved programming the infusion pump with an automatic repeat function, whereby pressing and holding any one of the scroll keys depressed causes the display to repeatedly increase or decrease until the scroll key is released. The repeat rate can also be changed depending on the amount of time the scroll key is pressed. For example, depressing the scroll key for several seconds may increase the repeat rate according to a function, which may be linear, or some other function, such as logarithmic. However, such prior systems may be disadvantageous in that the user may inadvertently scroll past the desired value by a large amount before releasing the scroll key. In other instances, the user may undershoot the desired value by releasing the scroll key too early. In either case, any potential savings in time that might have accrued from use of such a system may be lost.

Hence, those skilled in the art have recognized a need for a system and method of data input that is convenient, easy to use, and requires no additional scroll keys or other input controls, yet provides a user with an easily controlled ability to scroll through an extensive set of values, whether numerical, character or text based, that decreases data entry time and difficulty. This invention fulfills these and other needs.

SUMMARY OF THE INVENTION

Briefly and in general terms, the present invention is directed to a system for rapid input of data, the system comprising a display configured to display characters and a focus indicator, the focus indicator positioned on the display to indicate at least one changeable character from among the displayed characters, a processor in operable communication with the display and programmed to control the display to display the characters and to position the focus indicator based on a predetermined criterion, and an input device configured to signal the processor to display a changed value for the at least one changeable character on the display, the processor changing the position of the focus indicator if the processor determines that the position of the focus indicator must change based on the changed valued for the at least one changeable character.

In some aspects of the present invention, the processor up-shifts the position of the focus indicator when the changed value exceeds a first predetermined criterion. The processor down-shifts the position of the focus indicator when the changed valued falls below a second predetermined criterion in other aspects of the present invention. In yet other aspects, the processor down-shifts the position of the focus indicator when the processor determines that an elapsed time since the last signal is received from the input device exceeds a predetermined threshold.

In detailed aspects of the invention, the processor monitors the signals received from the input device and if the processor determines that the input device has not been released for longer than a predetermined time continues to display the changed value at an increased rate.

In accordance with further aspects of the invention, the focus indicator includes a first cue and a second cue, the first cue indicating a first changeable character, the second cue indicating a second changeable character, and the input device includes a first controller and a second controller, the first controller configured to signal the processor to change the first changeable character, the second controller configured to signal the processor to change the second changeable character. In more detailed aspects, the first controller includes a first up key configured to signal the processor to change the first changeable character in an increasing direction, and a first decrease key configured to signal the processor to change the first changeable character in a decreasing direction, while the second controller includes a second increase key configured to signal the processor to change the second changeable character in an increasing direction, and a second decrease key configured to signal the processor to change the second changeable character in a decreasing direction.

The present invention is also generally directed to a method for rapid input of data, the method comprising displaying a plurality of characters, displaying a focus indicator indicating at least one changeable character from among the plurality of displayed characters, detecting whether a control device is activated to change the at least one changeable character, changing the at least one changeable character when the control device is activated, and adjusting the focus indicator's position based on a predetermined criterion.

In detailed aspects of the invention, displaying characters comprises generating a visual message. Displaying characters comprises generating an audible message in other detailed aspects. In still other detailed aspects, displaying characters comprises generating a tactile message.

In further aspects in accordance with the invention, displaying the focus indicator comprises generating a visual cue associated with the at least one changeable character. Displaying the focus indicator comprises generating an audible cue associated with the at least one changeable character in other aspects. In additional aspects, displaying the focus indicator comprises generating a tactile cue associated with the at least one changeable character. Displaying the focus indicator in other aspects of the invention comprises generating a first cue and a second cue, the first cue indicating a first changeable character, the second cue indicating a second changeable character.

Adjusting the focus indicator's position in more detailed aspects of the invention comprises determining a value defined by the displayed characters, comparing the value defined by the displayed characters with a first value and a second value, and moving the focus indicator when the valued defined by the displayed characters changes from the first value to the second value.

In other detailed aspects, adjusting the focus indicator's position comprises determining an elapsed time from since the last activation of the control device, and moving the focus indicator to a position of lesser value when the elapsed time exceeds a predetermined time.

The novel features of this invention, as well as the invention itself, both as to its structure and operation, will be best understood from the accompanying drawings, taken in conjunction with the accompanying description.

BRIEF DESCRIPTION OF THE DRAWINGS

FIG. 6 shows four numerical sequences (cases one through four) illustrating an exemplary method of inputting data in association with the logic flow chart of FIG. 5;

FIG. 7 shows three numerical sequences (cases five through seven) illustrating an exemplary method of inputting data in association with the logic flow chart of FIG. 5;

DETAILED DESCRIPTION OF THE PREFERRED EMBODIMENTS

Figure 1:
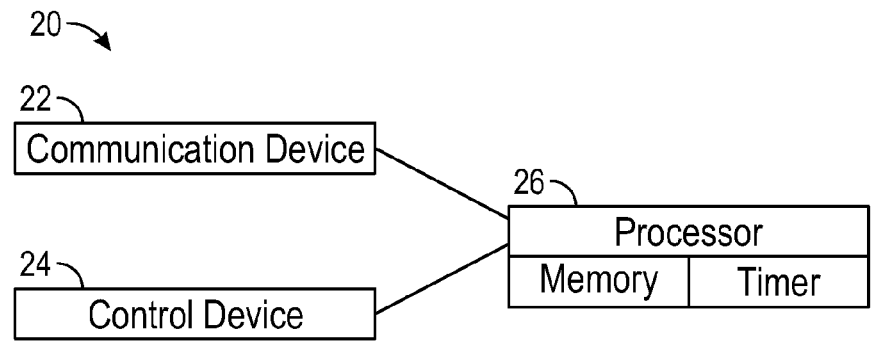
FIG. 1 is a block diagram of a data input system showing a user-activated input or control device for controlling characters communicated by a communication device, the control device and the communication device both coupled to a processor having an associated memory and timer that enable the processor to automatically alter the control device's effect on the communication device.

Referring now in more detail to the exemplary drawings, wherein like reference numerals designate corresponding or like elements among the several views, general and specific embodiments incorporating various aspects of the invention will be described.

In general terms, the invention is embodied in a system and method providing for rapid selection of items that are contained in lists, which may be extensive, of numbers, characters, or textual content. One embodiment incorporating aspects of the present invention is shown in FIG. 1 which shows a schematic diagram illustrating a data input system 20 comprising a communication device 22 and an input or control device 24, both coupled to a processor 26 preferably having an associated memory 25 and timer device 27 or internal timing function. In this embodiment, the control device 24 is configured to accept commands or input from a user which are then operated upon by the processor 26 to change the information that is communicated by the communication device.

Typically, the communication device 22 is configured to display numbers, characters, or textual content that changes in response to the user commands entered into the control device. Non-limiting examples of such a communication device includes alphanumeric LED displays, liquid crystal video displays, and mechanical displays. Alternatively, or in addition to displaying numbers, the communication device may be configured to display letters, characters, symbols, and/or graphical icons, so that the system can be used to input a patient's name or other types of data that may be useful to an institution using the system. The communication device may also be configured to communicate in an audible or tactile manner. For example, voice or Braille messages may be generated by the communication device to allow the system to be used by visually impaired users.

Figure 2:
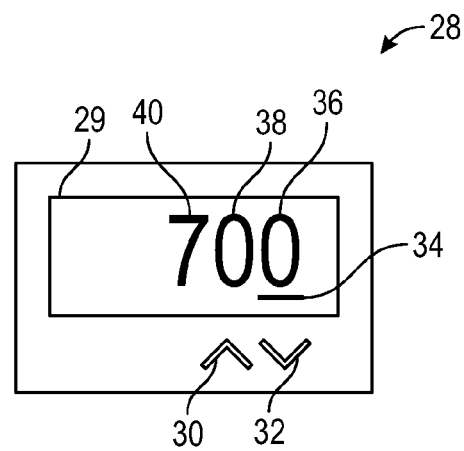
FIG. 2 is a schematic diagram of a front panel incorporating the system of FIG. 1 showing UP and DOWN keys associated with a focus indicator to change the displayed numerical value.

FIG. 2 shows a front panel 28, such as may be used for inputting parameters into an infusion pump, physiological monitoring device, or non-medical electronic device to program the device for operation, or to enter data for use by the device in monitoring and recording the status or condition of a patient or a course of treatment. In the case of an infusion pump, the processor 26 (FIG. 1) would communicate infusion parameters input by a user to a pump controller (not shown) coupled to a syringe driver for example (not shown). For purposes of illustration, reference will be made herein to use of various embodiments of the present invention for inputting data and controlling an infusion pump, but those skilled in the art will immediately understand that the principles of the present invention apply equally to other medical devices, such as monitoring devices, where entry of data, and selection of values from lists, is needed.

In the embodiment of an infusion pump display illustrated in FIG. 2, the panel includes a display 29 configured to show four characters or digits and a focus indicator 34. The focus indicator is useful in that it identifies which digit or character displayed on display 29 that is active, that is, can be changed using the controls of the device. Of course, the display may be configured to show more than four characters or digits so as to accommodate inputting numerical values greater than "9999" or less than "−9999", or numerical values having an accuracy greater than five or more significant digits, such as "1.0001".

Panel 28 also includes an UP key 30 and a DOWN key 32 for scrolling the display and value of the digit or character indicated by the focus indicator 34 upwards and downwards, respectively.

The UP key 30 and DOWN key 32 may be physical switches, such as bubble-style or membrane switches. Alternatively, UP key 30 and DOWN key 32 may be soft-keys displayed on a touch sensitive or other type of display. Such keys are displayed as needed depending on the configuration and programming of the infusion pump or medical device. It will be immediately appreciated by persons of ordinary skill in the art that other types keys or icons, apart from the UP and DOWN keys illustrated in FIG. 2, may be used in order to change the value shown on the display 29. For example, track balls, joysticks, touch pads, and scroll wheels may be used for scrolling the displayed value either upwards or downwards. It is contemplated that air pressure or eye movement detection devices may also be used to enable persons with spinal injuries to input data using the system 20.

In the illustrated embodiment, the focus indicator 34 is visual, appearing as a single bar. As stated above, the focus indicator 34 identifies that digit or character that will be changed when the user presses either the UP key 30 or the DOWN key 32, For example, in FIG. 2, the focus indicator 34 is positioned beneath the ones digit 36 at the far right of the display 29. Thus, the displayed numerical value will increase by an increment of one when the UP key 30 is pressed and will decrease by the same increment when the DOWN key 32 is pressed.

The processor 26 tracks the numerical value shown on the display 29, and depending on that numerical value, adjusts the position of the focus indicator 34 shown on the display 29. For example, pressing the UP key 30 causes the ones digit 36 to increment upwards. When it reaches "9", the processor can be controlled to automatically shift the focus indicator to the left so that it appears under the tens digit 38 when the UP key is pressed the next time. As such, the focus indicator may also appear beneath the tens digit 38 or hundreds digit 40, as explained in greater detail in connection with FIG. 3 below. In other embodiments, the processor may be programmed to keep the focus indicator located under the ones digit and display a "0" when the UP key is pressed a further time.

It will be immediately appreciated that other visual cues may be used as an alternative to or in combination with the single bar to indicate a changeable digit associated with the UP and DOWN keys 30, 32. Non-limiting examples of such focus indicators include, for example, displaying the changeable digit at a distinct brightness or intensity, or color displaying the changeable digit in a larger size than non-changing digits, or displaying a cursor, pointer, or other graphical icon that in some way points out to a user which digit will be changed upon a key press. In alternative embodiments, the focus indicator may be an illuminated LED lamp (not shown) disposed below or above the display 29.

In other embodiments wherein the communication device 22 is configured to communicate numbers, characters, or textual content with a voice message, an audible cue may be used as a focus indicator. Examples of audible cues include, for example, a momentary beep or tone superimposed over the voice message, or a distinct change in pitch or loudness of a portion of the voice message. Alternatively, the focus indicator can be a raised bar or other tactile cue when the communication device is configured to communicate in Braille.

Figure 3:
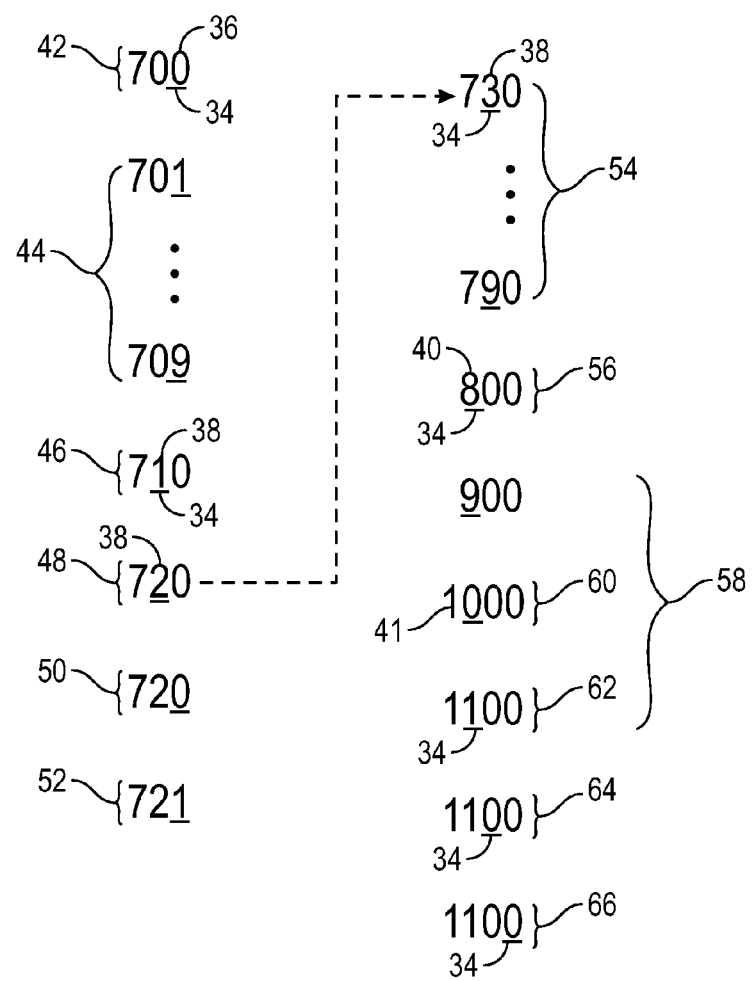
FIG. 3 shows two numerical sequences illustrating an exemplary method of inputting data, using the UP and DOWN keys of FIG. 2 in combination with up-shifting and time-based decay functions executed by a processor to adjust the focus indicator's position.

FIG. 3 illustrates the operation of one embodiment of the present invention, showing the change in the display 29 of FIG. 2 as a function of pressing keys 30 and 32. In this example, when the ones digit 36 is increasing, the position of the focus indicator 34 moves left under the tens digit when the ones digit exceeds "9". As illustrated at segment 42 of the sequence, the display initially shows "700" and the focus indicator 34 appears below the ones digit. When the UP key 30 is pressed or otherwise activated by the user, the ones digit increases from "0" to "9", as shown at segment 44, whereafter the focus indicator moves from the ones digit to the tens digit 38, as shown at segment 46. Once the focus indicator shifts under the tens digit, further activation of the UP key 30 causes the displayed value to scroll upwards in increments of ten.

Referring now to segment 48, where the display shows "720," if the UP key 30 is released or otherwise deactivated by the user, the processor 26 (FIG. 1) begins to keep track of the time elapsed after the release of the key. After a predefined amount of time, preferably about two seconds, the focus indicator decays, meaning it moves from beneath the tens digit back to beneath the ones digit, as shown at segment 50. After this time-based decay, the display is again configured to scroll in increments of one. Accordingly, when the UP key is pressed momentarily, the display shows "721", as shown at segment 52.

Alternatively, when at segment 48, if the user continues to press and activate the UP key 30, the tens digit 38 continues to increase, as shown at segment 54. When the numerical value transitions from "790" to "800", the focus indicator 34 up-shifts a second time, moving from the tens digit to the hundreds digit 40, as shown at segment 56. Continued pressing and activation of the UP key results in the displayed value increasing by increments of one hundred, as shown at segment 58. In the illustrated embodiment, the focus indicator does not move from the hundreds digit to the thousands digit 41 when the display shows "1000", as shown at segment 60. The absence of an up-shift at "1000" is desirable in applications of the system 20 where the maximum allowed input value is near "1000" or "2000", or if the desired input value rarely exceeds "1000" or "2000". In such applications, an up-shift at "1000" will cause the user to overshoot the desired input value. Those skilled in the art will understand, however, that, in other embodiments of the present invention, the system 20 may be configured to up-shift to the thousands digit 41 depending on the type of parameter being input or depending on the preferences or criteria programmed into the system by the institution or user.

Still referring to FIG. 3, if, as shown at segment 62, the display shows "1100" and the UP key 30 is released by the user, the processor 26 may be programmed to keep track of the elapsed time since the UP key was released. In this embodiment, the processor is programmed to cause the focus indicator to decay after a predefined amount of time, preferably about two seconds, meaning it moves from the hundreds digit 38 to the tens digit 36, as shown at segment 64. About two seconds later, the processor causes the focus indicator to decay further, moving the focus indicator from the tens digit to the ones digit 34, as shown at segment 66. The user may activate the UP key or DOWN key at segment 64 to change the tens digit or at segment 66 to change the ones digit. This time-based decay feature of the present invention is advantageous because it allows the user, needing to set a very particular and exact value having a significant number of digits, characters or textual content, to scroll very quickly upwards from a beginning point, for example, zero, using the UP key or other control device, and then automatically provides access to lower order digits within a few seconds without further intervention by the user so that the user may vary those digits using either the UP or DOWN keys or other control device as the focus indicator shifts towards the right of the display.

Figure 4:
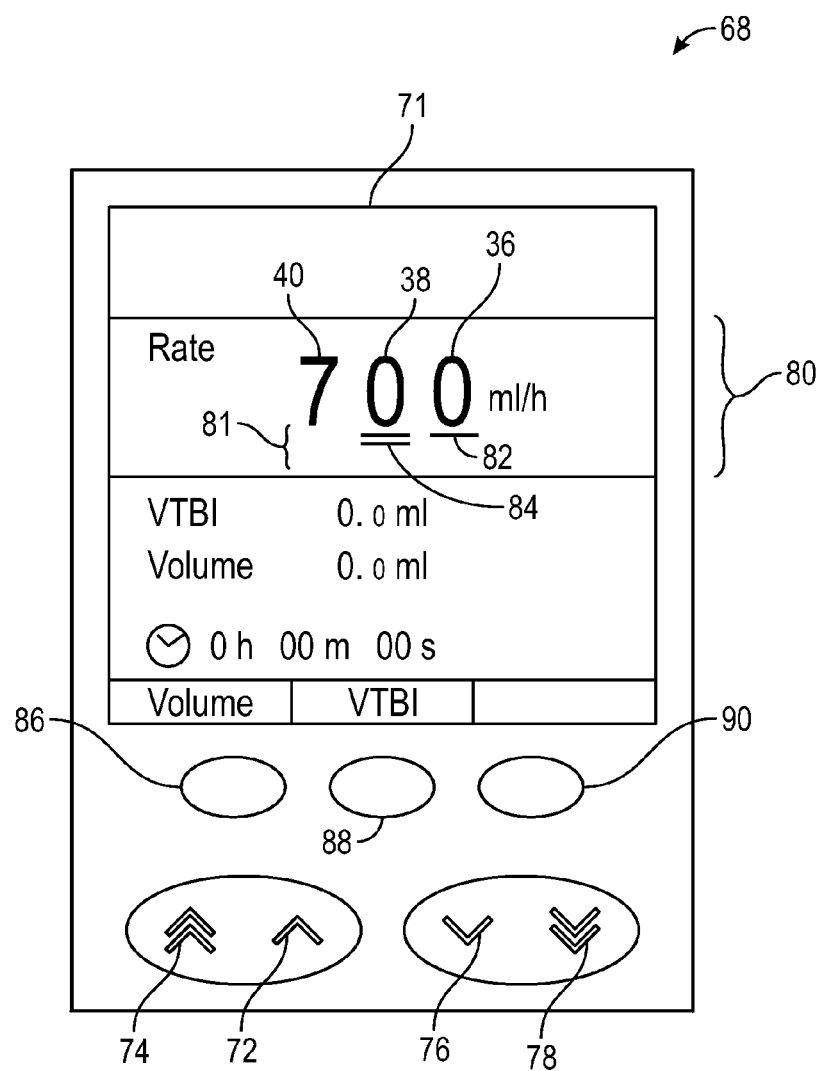
FIG. 4 is diagram of a front panel for inputting operational parameters of a medical device, such as an infusion pump, the front panel having a display screen and a control device with two sets of UP and DOWN keys, the display screen showing a two-part focus indicator appearing as a single bar and a double bar, the single bar associated with UP and DOWN keys marked with a single-chevron symbol and the double bar associated with UP and DOWN keys marked with a double-chevron symbol.

FIG. 4 illustrates another embodiment of the present invention incorporated into an infusion pump having a panel 68 for inputting operational parameters. The panel 68 includes a display 71 and four scroll keys: a single-chevron UP key 72, a double-chevron UP key 74, a single-chevron DOWN key 76, and a double-chevron DOWN key 78. The display shows three infusion parameters designated as "RATE", "VTBI" (volume to be infused), and "VOLUME". The infusion time is also shown adjacent a clock icon.

The RATE parameter is displayed on a scrolling portion 80 of display 71 shown with a focus indicator 81 positioned under the tens digit 38 and ones digit 36. The focus indicator has two parts: a first cue appearing as a single bar 82 positioned under the ones digit, and a second cue appearing as a double bar 84 positioned under the tens digit. The double-chevron scroll keys 74 and 78 function to change the digit above the double bar and the single-chevron scroll keys 72 and 76 function to change the digit above the single bar. The function of the scroll keys is quickly and intuitively understood by the user because of the graphic similarity between the focus cues and the markings on the scroll keys. This dual set of focus cues and scroll keys enhances the ability of users to rapidly input very particular and exact numerical value, as described in more detail below.

Preferably, though not necessarily, the function of each of the scroll keys 72, 74, 76, and 78 automatically repeats when any one of the keys is pressed and held, repeating initially, for example, every 0.5 seconds for the first three seconds that the key is pressed, and then accelerating to a "fast" repeat rate of 0.25 seconds after the key is pressed for more than three seconds. After any of the scroll keys are released, the repeat rate returns immediately to the initial repeat rate of 0.5 seconds, ready for a subsequent press. Of course, other time settings and rates may be used for the initial and fast repeat rates as appropriate for the type of operational parameter being inputted or as determined by the institution.

With continued reference to FIG. 4, the panel 68 of the display 71 also includes parameter selection buttons 86, 88, and 90. Operational parameters associated with the selection buttons are indicated on the display 71 above the selection buttons, and may change depending on the configuration of the medical device or infusion pump. Moreover, the parameter selection buttons 86, 88, and 90 may be programmed differently depending on user input that changes the screen as necessary to allow for input of all parameters needed to operate a given infusion pump or medical device.

In the illustrated embodiment, pressing the selection button 86 changes the information shown in the display 71 by replacing the RATE parameter shown in the scroll portion 80 of the display screen with the VOLUME parameter, thereby allowing input of a volumetric value using the scroll keys 72, 74, 76, and 78. Pressing the parameter selection button 86 also causes RATE to be displayed above the selection button 90. Similarly, the parameter selection button 88 functions to place the VTBI parameter in the scroll portion 80 of display 71. In other embodiments, other types of parameters may be shown on the display screen as appropriate for the type of medical device.

Figure 5:
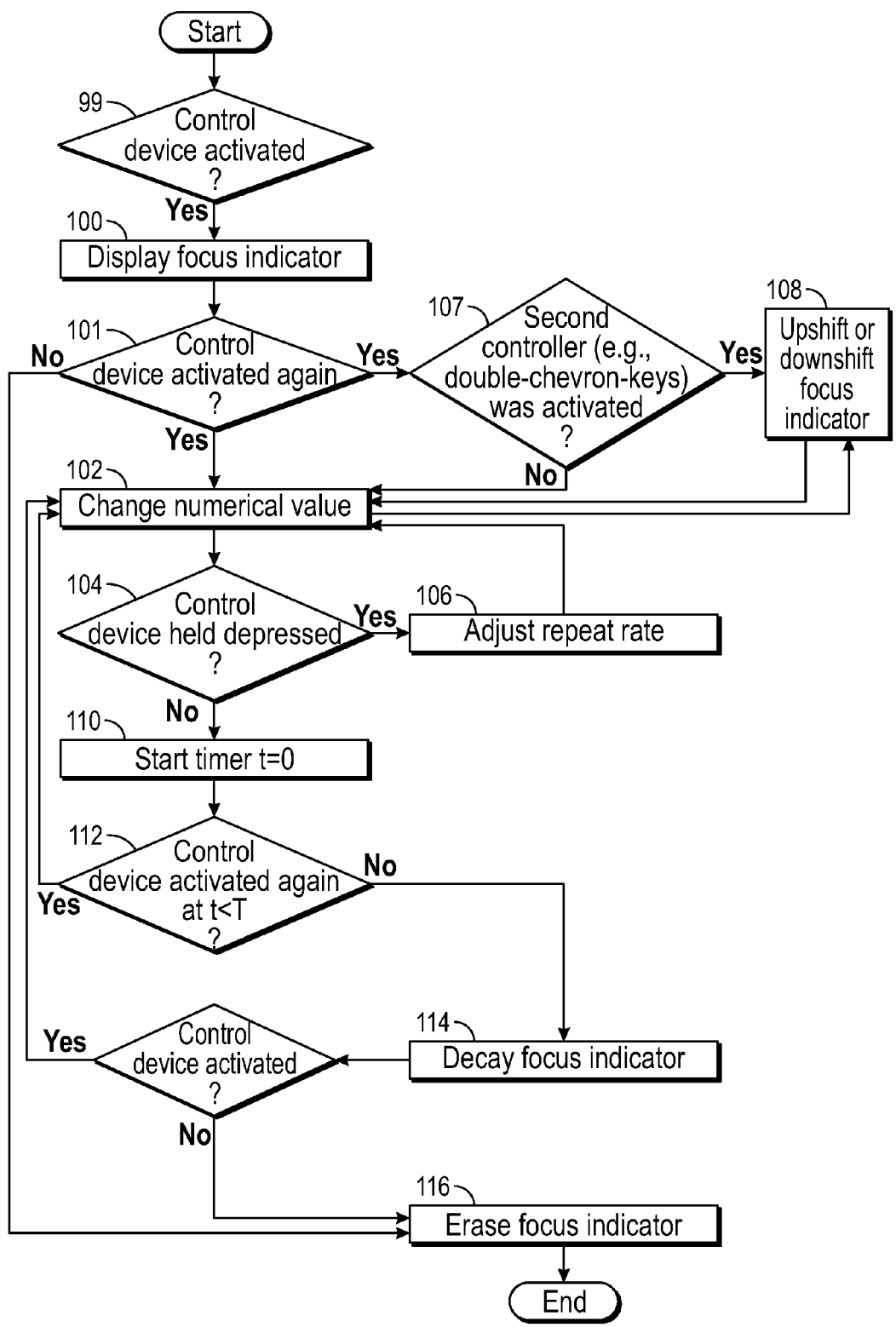
FIG. 5 shows a logic flow chart illustrating an exemplary method of inputting data that includes up-shifting, down-shifting, and time-based decay functions executed by the processor to change the focus indicator's position.

FIG. 5 shows a flow chart illustrating a method of adjusting the position of a focus indicator 34 (for example, as is shown in FIG. 2) in accordance with an embodiment of the present invention. The flow chart begins with the processor polling 99 its communication line to determine if a control device, such as one of the scroll keys 72, 74, 76, and 78 of FIG. 4 is pressed by a user. If a control device is activated, a focus indicator is displayed on the display 71 (also FIG. 4) at block 100. Preferably, the focus indicator initially appears at the far right of the display. Where the focus indicator has a first cue consisting of a single bar 82 and a second cue consisting of a double bar 84, the focus indicator initially appears with a single bar under the ones digit 36 and a double bar under the tens digit 38. Depending on the programming of the processor 26 (FIG. 1), the focus indicator may disappear after, for example, two seconds if no further presses of the scroll keys are made, as indicated by blocks 101 and 116. If the control device times out in this manner, the program branches to block 116 and the focus indicator is erased from the display. If the control device is activated, the program moves to either block 102 or block 107 depending on which control device has been activated.

When the single-chevron UP key 72 or the single-chevron DOWN key 76 is pressed and the program moves to block 102, the digit above the single bar 82 scrolls up by one increment or down one increment, respectively, at block 102. If the processor determines that any of the scroll keys 72, 74, 76, 78 is held in a depressed (or pressed) state in block 104, the processor repeatedly increments or decrements the digit. If the processor determines that a selected period of time has elapsed since the scroll key was pressed, such as for at least three seconds, the processor may adjust the repeat rate of the digit change in block 106 to increase the rate of increment or decrement.

Alternatively, if the processor senses that the double-chevron UP key 74 the double-chevron DOWN key 78 is pressed in block 107, the digit above the double bar 84 scrolls up one increment or down one increment, respectively, at block 102. If either one of the keys is held depressed, its function is repeated automatically, as indicated at block 104. At block 106, the repeat rate is increased to a fast repeat rate when the key is held depressed beyond a predetermined time.

Preferably, as shown at block 108, the positions of the single bar 82 and the double bar 84 are allowed to be adjusted as the processor increments and decrements the digits in response to the scroll key press. This position adjustment or shifting of the focus indicator is described in further detail below in connection with FIG. 6.

Returning now to block 104, if the processor determines that the scroll key has been released, the processor starts a timer in block 110. In block 112, the processor tests to determine whether a scroll key has been pressed within a predetermined threshold "T". If a scroll key is pressed before the timer reaches the predetermined threshold, the program branches back to block 102 and continues.

If no scroll key press has been sensed by the processor before the timer exceeds the predetermined threshold, the program continues to block 114 where the processor causes the focus indicator to decay, that is, move to the next lowest digit position. The threshold "T" may be set, for example, at two seconds. After two seconds elapse without a scroll key press, the processor causes the focus indicator to shift to the right by one digit, if possible. Where the focus indicator has been shifted multiple positions to the left, the processor may wait a further period of time and then shift the focus indicator another place to the right, and continue this loop until the focus indicator has returned to the right-most digit in display 71, or until a scroll key is pressed. Where the focus indicator has a double and single bar, such as is illustrated in FIG. 4, the decay repeats until the double bar is under the tens digit and the single bar is under the ones digit. After an additional period of time elapses without a scroll key press, such as, for example, two seconds, the processor removes the focus indicator from the display 71 in block 116.

At any time when the focus indicator is visible during the decay, any scroll key may be depressed in order to increment an associated digit up or down. As such, the time decay function allows the user to scroll up to a desired thousands or ten-thousands digit by pressing and holding the double-chevron UP key 74, and thereafter quickly adjust the remaining digits using single-chevron UP and DOWN keys 72, 76 as the single bar passes under the lower order digits.

Figures 6, 7:
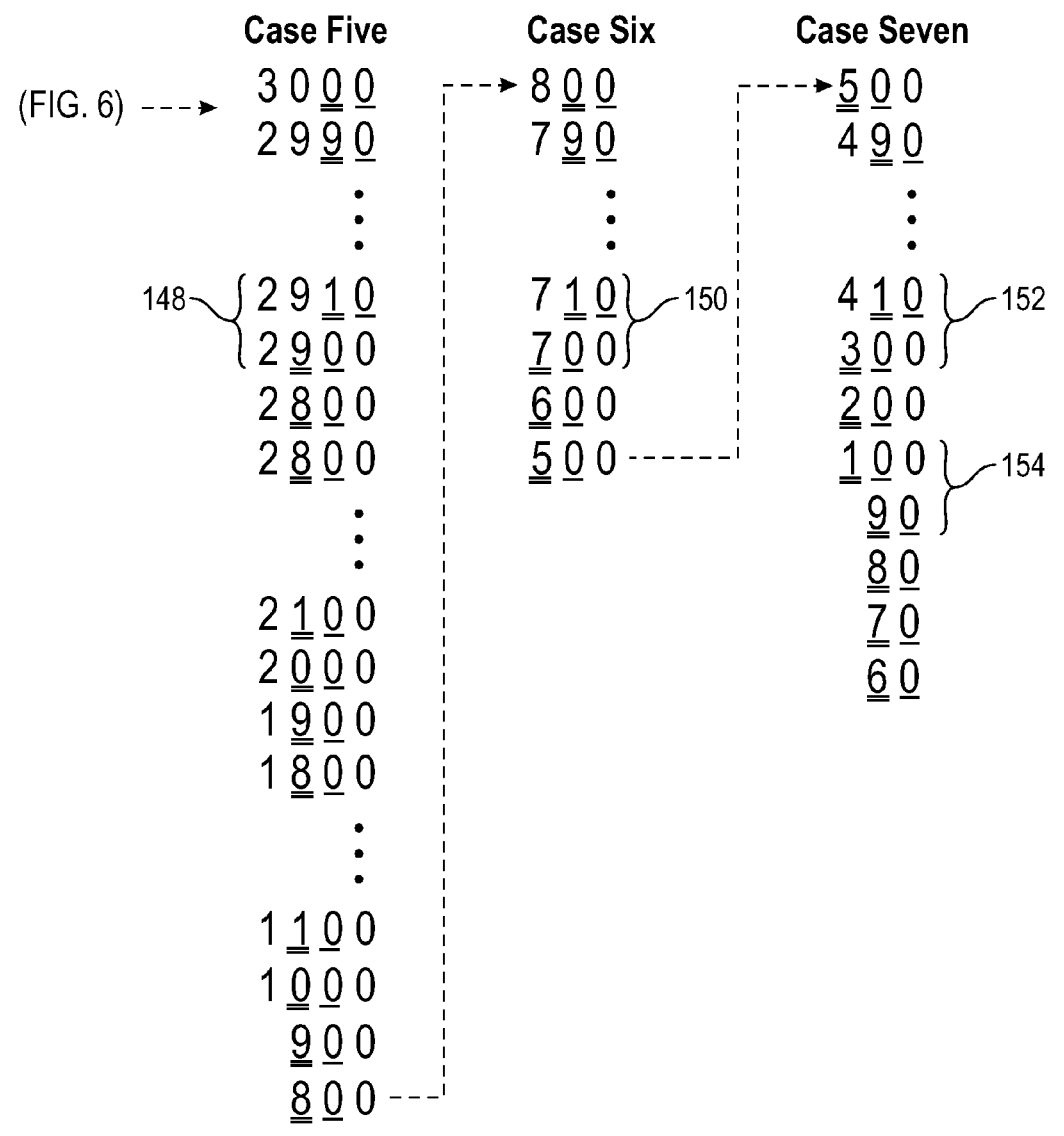

FIG. 6 illustrates a method of inputting data and of adjusting the position of a focus indicator having a first cue appearing as a single bar and a second cue appearing as a double bar using four sequences of numerical values that are displayed to a user on display 71 (FIG. 4). The four sequences, designated Case One, Case Two, Case Three and Case Four, illustrate possible situations wherein a double-chevron UP key 74 or other control device is activated to increase the numerical value shown on the display. By necessity, the first and second cues shown in FIG. 6 are visual; however, it is not intended that the method be limited to visual cues. For instance, when the system is configured to communicate voice messages, the first cue can be a tone having an initial high pitch tone or volume the second cue can be a tone having an even higher pitch or volume. Such increases in pitch and volume may be applied during part of the voice message corresponding to a particular numerical digit, letter, character, or word being communicated.

In Case One, the display 71 initially shows "05" without a focus indicator 34. When a scroll key is pressed, the focus indicator appears as a double bar beneath the tens digit and a single bar beneath the ones digit. When a double-chevron UP key 74 is held depressed, the screen immediately shows "10" and thereafter increases repeatedly by increments of ten every half-second, or some other repeat time period suitable for a particular application of the present invention. After a predetermined time, such as three seconds, the repeat rate rises to a faster rate, such that the numerical value shown on the display increases repeatedly by increments of ten every quarter of a second, or some other, suitable faster repeat rate. Only when the faster repeat rate is attained will the processor possibly adjust the focus indicator's position. This delay in adjusting the focus indicator's position has the advantage of reducing the possibility of overshooting a desired input value that is near the initially displayed value.

With continued reference to Case One, the position of the focus indicator is up-shifted when the display transitions from a first value of "190" to a second value of "200", as indicated at segment 140 of the sequence. As used herein, up-shift refers to movement to the left by one digit, movement up by one decade, movement up by one order of magnitude, or some other upward movement in the position of the focus indicator. The double bar now appears beneath the hundreds digit and the single bar appears beneath the tens digit. Accordingly, by continuing to press the double-chevron UP key 74, the displayed numerical value increases by increments of one hundred.

In other embodiments, the up-shift criterion may differ depending on the numerical value that is typically input by the user. For example, in cases where the user never inputs values below "200", it would be advantageous to have an up-shift when the displayed value transitions from "90" to "100". In such a case, the up-shift criterion may include a first value of "90" and a second value of "100". In addition, there may be more than one set of up-shift criteria to trigger an adjustment of the focus indicator. For example, in cases where the user often inputs values above "3000", it would be convenient to impose a second up-shift when the displayed value transitions from "900" to "1000", such that the double bar shifts to the thousands digit and the single bar shifts to the hundreds digit.

The exemplary situation illustrated by Case Two may arise when the display screen initially shows 200 and a scroll key is pressed, thereby causing the focus indicator to appear at the far right of display 71. Alternatively, Case Two may arise from Case One, wherein the user releases the double-chevron UP key when the display shows "200", thereby allowing the focus indicator to decay to the right by one digit after a few seconds, as previously explained above in connection with block 114 of FIG. 5. At such time when the double bar appears beneath the tens digit, depressing the double-chevron UP key and holding it depressed will cause the displayed numerical value to increase by increments of ten. After "290" is displayed, the focus indicator up-shifts such that when "300" is displayed the double bar appears beneath the hundreds digit, as shown at segment 142 of the sequence. With the double-chevron UP key held depressed, the displayed numerical value subsequently increases by increments of one hundred. In this case, the up-shift is triggered by a transition from a first value of "290" to a second value of "300". It will be understood that this up-shift at "300" did not occur in Case One because the displayed value in Case One transitioned from "200" to "300", but did not transition "290" to "300".

Preferably, though not necessarily, the processor may store in memory or be provided with similar up-shift criteria at every subsequent century or hundred increment: "390" to "400", "490" to "500", . . . "990" to "1000", "1090" to "1100", "1190" to "1200", and so on. Case Three demonstrates the 390-to-400 up-shift criterion at segment 144 in an exemplary situation similar to Case Two. Case Four demonstrates the 1190-to-1200 up-shift criterion at segment 146 in an exemplary situation also similar to Case Two. These up-shifts have the advantage accelerating the scroll rate of the displayed value, thereby saving the user's time when changing an initially displayed value to a different value that is substantially greater.

FIG. 7 shows three sequences of numerical values shown on a display 71 (FIG. 4) and illustrates a method of inputting data and of adjusting the position of a focus indicator 34 having a first cue appearing as a single bar and a second cue appearing as a double bar. The three sequences, designated Case Five, Case Six, and Case Seven, illustrate possible situations wherein a double-chevron DOWN key 78 or other control device 24 is activated to decrease the numerical value shown on the display.

In Case Five, the display 71 initially shows "3000", as may occur after Case One when the user releases the scroll key and allows the focus indicator to decay to the far right position, such that the double bar appears beneath tens digit. At such time when a double-chevron DOWN key 78 or other control device 24 is held depressed, the displayed numerical value scrolls down by increments often. After "2910" is displayed, the focus indicator shifts to the left by one digit such that when "2900" is displayed the double bar appears beneath the hundreds digit, as shown at segment 148 of the sequence. In this case, the up-shift is triggered by a transition from a first value of "2910" to a second value of "2900".

Preferably, though not necessarily, the processor may store or be programmed with similar up-shift criterion at every century or hundred increment: "2810" to "2800", "2710" to "2700", "2610" to "2600", and so on. Case Six demonstrates the 710-to-700 up-shift criterion at segment 150 in an exemplary situation that may arise from Case Five, wherein the user releases the double-chevron DOWN key at "800" and allows the double bar to decay from the hundreds digit to the tens digit. Case Seven demonstrates the 410-to-400 up-shift criterion at segment 152 in an exemplary situation that may arise from Case Six, wherein the user releases the double-chevron DOWN key at "500" and allows the double bar to decay from the hundreds digit to the tens digit. These up-shifts have the advantage of raising the scroll rate at which the displayed value may be decreased, thereby saving the user's time when changing an initially displayed value to a different value that is substantially lower.

It is to be understood that if the displayed value is initially "710" and the double-chevron DOWN key 78 is held depressed, the focus indicator with not adjust even when there is an up-shift criterion of 710-to-700. The up-shift criterion is ignored because the repeat rate has not had time to attain a faster repeat rate, which may take about three seconds or longer depending on the programming of the system. This brief delay has the advantage of preventing an overshoot from occurring when the user desires to make only a relatively small adjustment, say from "710" to "650".

When the numerical value shown on the display screen approaches zero, it is desirable to lower the rate at which the displayed value is decreased because the user is now expected to select a value near zero. By lowering the rate of decrease, the user is better able to release the double-chevron DOWN key 78 at a point corresponding to or very near the desired value. Accordingly, after "100" is displayed, the focus indicator shifts to the right by one digit such that when "90" is displayed the double bar appears beneath the tens digit, as shown at segment 154. In this case, the downshift is triggered by a transition from a first value of "100" to a second value of "90".

In other embodiments, the downshift criterion may differ depending on the numerical value that is typically inputted by the user. For example, in cases where the user is expected to input values near "100", it would be advantageous to have a down-shift when the displayed value transitions from "200" to "190" when the double-chevron DOWN key 78 is pressed and held. In addition, there may be more than one set of up-shift criterion to trigger an adjustment of the focus indicator. For example, in cases where the display screen is also configured to show negative values, it would be convenient to downshift when the displayed value transitions from "−200" to "−190" when the double-chevron UP key 74 is held depressed.

Although FIGS. 3, 6 and 7 show sequences of base ten data having ten characters or digits from "0" through "9", the present invention may also be used to input and communicate other types, groups, or systems of data and combinations thereof. Non-limiting examples are base eight data (e.g., octal numbers having eight characters from "0" through "7"), base-twelve data (e.g., calendar months characterized with names "January" to "December"), base-sixteen data (e.g., hexadecimal numbers having sixteen characters from "0" through "9" and "A" through "F"), base twenty-four data (e.g., hours characterized with numbers from "1" to "24"), base fifty-two data (e.g., an alphabet having fifty-two characters from "A" through "Z" and "a" through "z"), and base sixty data (e.g., seconds or minutes characterized with numbers from "1" to "60"). Accordingly, the present invention is applicable not only to medical devices, but to mobile telephones, personal digital assistants (PDAs), music players, navigation instruments, radios, clocks, wrist watches, digital cameras, video cameras, video game systems, diagnostic instruments, and devices where it is desirable to minimize the quantity of input keys and provide a rapid means of inputting telephone numbers, addresses, pass codes, geographic coordinates, frequencies, names, birth dates, times, or other data.

Figure 8:
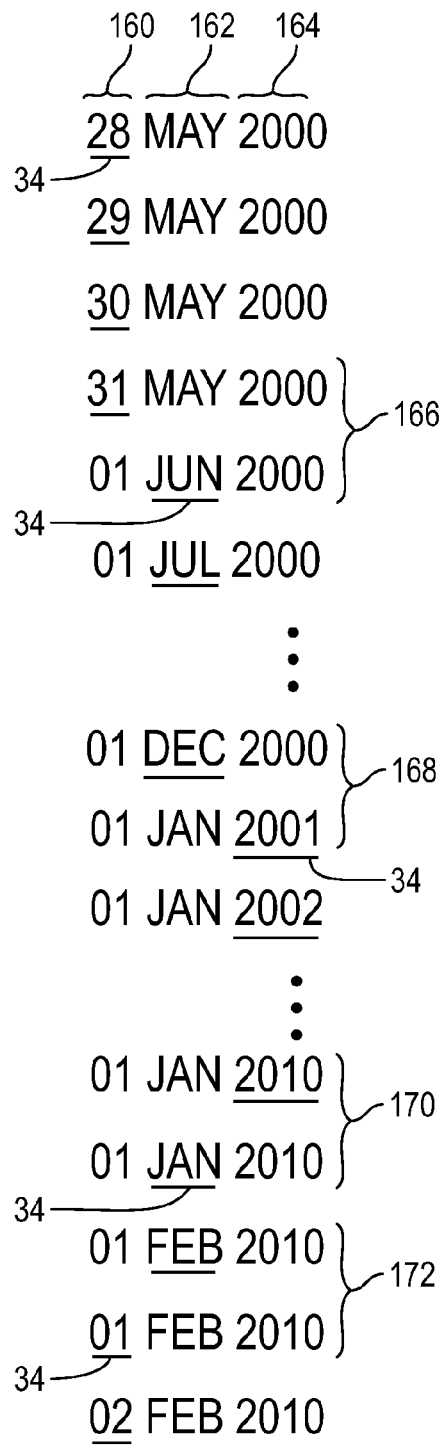
FIG. 8 shows a sequence of calendar dates illustrating an exemplary method of inputting data comprising a day character, a month character, and a year character.

A further illustration of the usefulness of the present invention is depicted in FIG. 8 which shows a sequence of dates shown on a date display illustrating a method of inputting a calendar date and of adjusting the position of a focus indicator 34 appearing as a single bar. In this embodiment, the date display shows three characters: a day character 160 represented by a two digit number, a month character 162 represented by a combination of three letters, and a year character 164 represented by a four digit number. A control device, including for example, one or more scroll keys, allows a user to selectively scroll the day character, month character, or year character, depending on the position of the focus indicator. As used herein, the term "character" refers generally to any communicated element that may be changeable by the control device.

With continued reference to FIG. 8, a user desiring to input a calendar date of "02 FEB 2010" when the date display initially shows "28 MAY 2000" with the focus indicator 34 positioned beneath the day character 160 activates the control device and the day character scrolls up from "28" to "31", the last day of the month of May. Thereafter, the focus indicator up-shifts from the day character to the month character 162, which is now "JUN", as shown at segment 166 of the sequence. The day character is now "01", the first day of the month of June. As the control device is held activated, the month character scrolls up from "JUN" to "DEC". Next, at segment 168, the focus indicator up-shifts from the month character to the year character 164, which is now "2001", whereafter, the year character scrolls up by increments of one. When the year character is "2010", the user deactivates the control device, thereby allowing the focus indicator to decay, as described previously. After a predetermined decay criterion of, for example, one second, the focus indicator moves from the year character to the month character after one second, shown at segment 170, whereupon the user momentarily activates the control device to change the month character from "JAN" to "FEB". After another second, the focus indicator moves to the day character, shown at segment 172, whereupon the user momentarily activates the control device to finally change the displayed date from "01 FEB 2010" to "02 FEB 2010".

Figure 9:
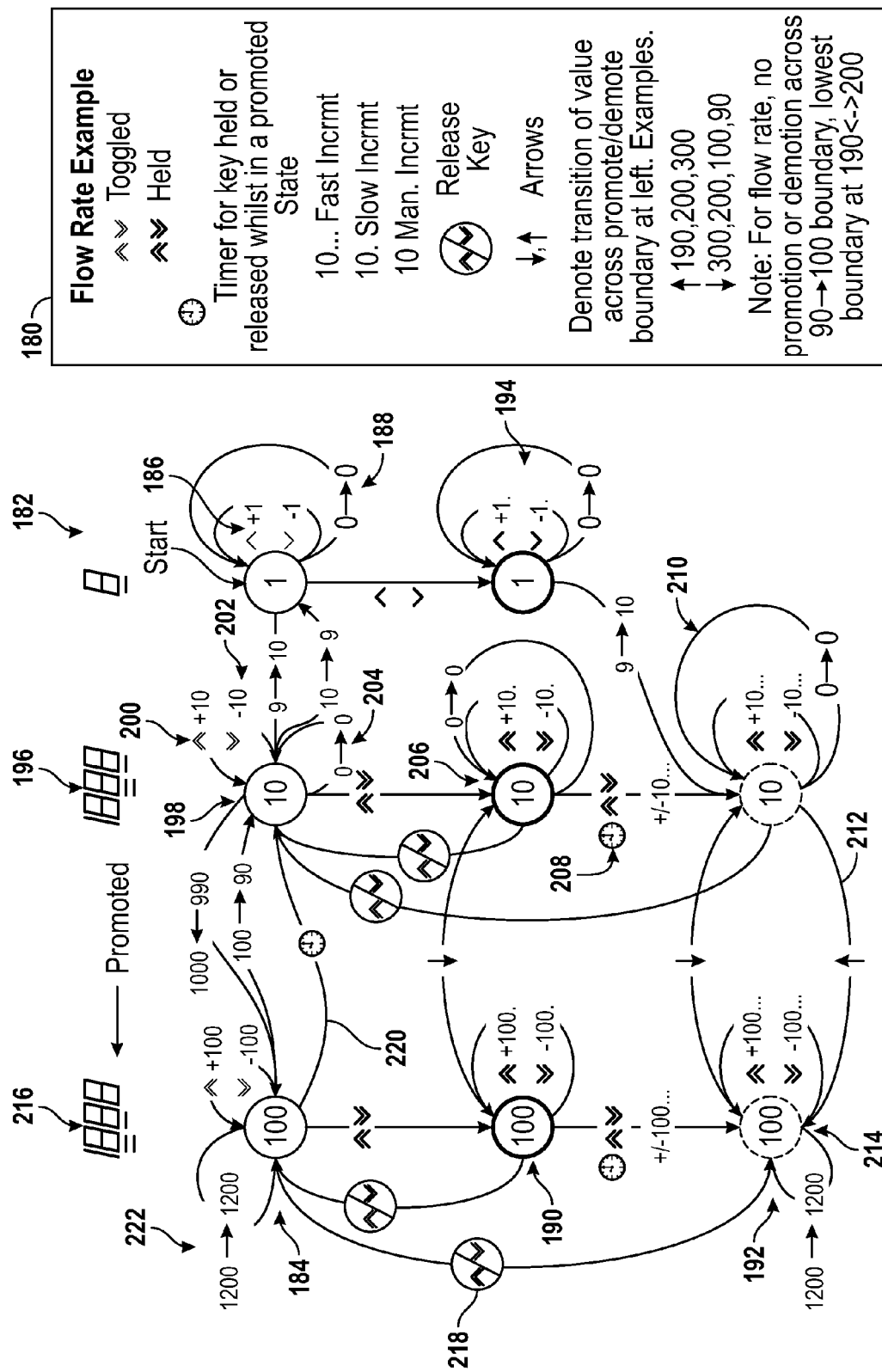
FIG. 9 is a state chart showing an embodiment in accordance with aspects of the invention for setting the flow rate of an infusion pump.
Figure 10:
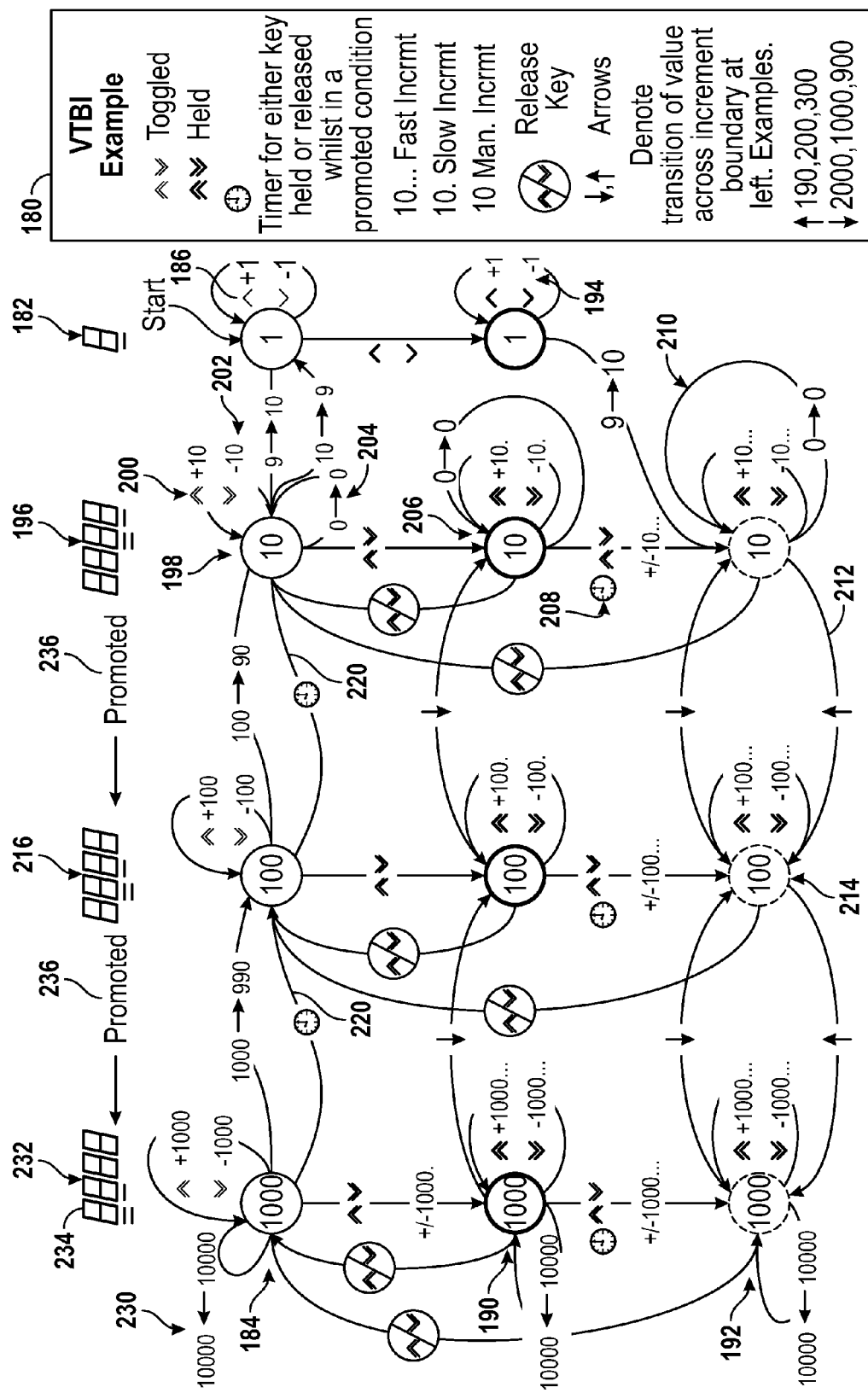
FIG. 10 is a state chart showing an embodiment in accordance with aspects of the invention for setting the volume to be infused ("VTBI") in an infusion pump.

State charts of two embodiments are shown in FIGS. 9 and 10. In FIG. 9, a state chart for setting the flow rate of an infusion pump is shown. The legend 180 defines certain symbols used in the chart and provides any programmed boundaries. For example, the legend provides that there is no promotion or demotion of keys across the values of 90 to 100. That is, an UP key will not be promoted from the tens digit to the hundreds digit when it crosses from the value of 90 to 100. It will remain at the tens digit. This is because many flow rates for infusion pumps are somewhere in the low 100's range, for example 120 ml/hr, and to promote the tens UP key from the tens to the hundreds digit at this boundary would cause it to overshoot directly to 200 from 90. The operator would then need to decrement from 200 to the correct value of 120.

The state chart of FIG. 9 shows the ones digit in the right-hand column 182. The first row 184 shows that the chevron keys 186 are used to manually increment and decrement by the value of one. Further, the lowest value that can be obtained by these keys, or any other, is zero 188. Holding the chevron keys 186 brings the operation to the third row 192. However, the value of incrementing and decrementing remains at one. Faster scrolling ("slow incrmt") 194 is possible.

Turning now to the center column 196, operation of the tens digit 198 is shown. Pressing the double chevrons 200 cause incrementing/decrementing by a value of ten 202. The lowest value that can be obtained in zero 204. Holding a key can result in faster scrolling 206 ("slow incrmt") and holding the key even longer (see the clock 208) can result in faster incrementing ("fast incrmt") 210. Promotion is possible 212 to the hundreds digit 214 in the left column 216. Releasing a scrolling key can result in slower scrolling 218 and even demotion to the tens digit 220. A maximum flow rate of 1200 is shown 222. Boundary values, such as the 90 value discussed above, may be programmed, depending on the application.

FIG. 10 presents a state chart for setting a volume to be infused in an infusion pump and operation occurs essentially as described above for setting infusion rate. However, in this case, the maximum value 230 that can be reached is 10000. Because this value is one digit higher than the highest infusion rate in the last example, a fourth column 232 exists in FIG. 10 showing the thousands digit 234. In this case, promotion/demotion 236 is possible from and to the tens, hundreds, and thousands digit.

While several particular forms of the invention have been illustrated and described, it will also be apparent that various modifications can be made without departing from the scope of the invention. For example, the system may include three or more sets of focus cues and scroll keys, such that triple bars and triple-chevron keys may be used to rapidly input data having four or more digits or characters. As a further example, the system may include an alphanumeric display for inputting personal identification codes (PINs), names, identification codes, medication order codes, and billing codes. It is also contemplated that various combinations or sub-combinations of the specific features and aspects of the disclosed embodiments can be combined with or substituted for one another in order to form varying modes of the invention. For example, the first cue and second cue of the focus indicator may be shifted independently using separate sets of up-shift, down-shift, and decay criteria as appropriate for the particular application of the system. Accordingly, it is not intended that the invention be limited, except as by the appended claims.

I claim:

1. A data input system comprising:
a display configured to display a plurality of characters and a focus indicator, the focus indicator positioned on the display to indicate at least one changeable character from among the displayed characters;
a processor in operable communication with the display and programmed to control the display to display the characters and to position the focus indicator; and
an input device configured to signal the processor to change the value for the at least one changeable character;
wherein the processor is configured to up-shift the position of the focus indicator when the value of the at least one changeable character changes to a first value and down-shift the position of the focus indicator when an elapsed time since the last signal is received from the input device exceeds a predetermined threshold.

2. The system of claim 1, wherein:
the input device comprises an up key;
the input device is configured to signal the processor to increment the value of the at least one changeable character when the up key is actuated; and
the processor is further configured to increment the next-higher character at the same time that the position of the focus indicator is up-shifted.

3. The system of claim 2, wherein:
the input device comprises a down key;
the input device is configured to signal the processor to decrement the value of the at least one changeable character when the down key is actuated; and
the processor is further configured to decrement the next-higher character and not shift the position of the focus indicator when the value of the changeable character is the first value and the value of the next-higher numeric character is greater than the first value.

4. The system of claim 1, wherein the processor is configured to monitor the signals received from the input device and, if the input device has not been released for longer than a first period of time, change the value of the at least one changeable character at a first rate.

5. The system of claim 4, wherein the processor is further configured to, if the input device has not been released for longer than a second period of time, change the value of the at least one changeable character at a second rate, wherein the second period of time is longer than the first period of time and the second rate is faster than the first rate.

6. A data input system comprising:
a display configured to display a plurality of characters and a focus indicator comprising a first cue and a second cue, the first cue indicating a first changeable character, the second cue indicating a second changeable character;
a processor in operable communication with the display and programmed to control the display to display the characters and to position the first and second cues; and
an input device comprising a first controller and a second controller, the first controller configured to signal the processor to change the value of the first changeable character, the second controller configured to signal the processor to change the value of the second changeable character;
wherein the processor is configured to up-shift the position of the first and second cues when the first changeable character reaches a first initial value and down-shift the position of the first and second cues when an elapsed time since the last signal is received from the first controller exceeds a first predetermined threshold, and wherein the processor is further configured to up-shift the position of the second cue when the second changeable character reaches a second initial value and down-shift the position of the second cue when an elapsed time since the last signal is received from the second controller exceeds a second predetermined threshold.

7. The system of claim 6, wherein:
the first controller includes a first up key configured to signal the processor to increment the first changeable character, and a first down key configured to signal the processor to decrement the first changeable character; and
the second controller includes a second up key configured to signal the processor to increment the second changeable character, and a second down key configured to signal the processor to decrement the second changeable character.

8. A data input method comprising the steps of:
displaying a plurality of characters;
displaying a focus indicator indicating at least one changeable character from among the plurality of displayed characters;
detecting whether a control device is activated;
changing the at least one changeable character when the control device is activated;
up-shifting the position of the focus indicator when the at least one changeable character reaches a first value; and
down-shifting the position of the focus indicator when an elapsed time since the control device was activated exceeds a predetermined threshold.

9. The system of claim 1, wherein the characters comprise numeric characters and the first value is 0.

10. The system of claim 1, wherein:
the displayed characters comprise a phrase selected from a list of alpha-numeric phrases having a first phrase; and
the processor is configured to up-shift the position of the focus indicator when the value of the changeable character changes to the first phrase.

11. The system of claim 10, wherein the list of alpha-numeric phrases comprises a list of representations of months of a year.

12. The system of claim 11, wherein the list of alpha-numeric phrases comprises a plurality of lists comprising dates in each of the months.

13. The system of claim 10, wherein the list of alpha-numeric phrases comprises representations of years.

14. The system of claim 7, wherein:
the displayed characters comprise numeric characters;
the first character is 0;
the second character is 0;
the processor is further configured to change the value of the first changeable character from 0 to 9 and decrement the next-higher character and not shift the position of the first and second cues when the first changeable character value is 0 and the value of the next-higher character is 1 or larger; and
the processor is further configured to change the value of the second changeable character from 0 to 9 and decrement the next-higher character and not shift the position of the first and second cues when the second changeable character value is 0 and the value of the next-higher character is 1 or larger.

15. The system of claim 7, wherein:
the displayed characters comprise a phrase selected from a list of alpha-numeric phrases having a first phrase; and
the processor is configured to up-shift the position of the focus indicator when the value of the changeable character changes to the first phrase.

* * * * *